United States Patent [19]

Lake

[11] 4,349,711
[45] Sep. 14, 1982

[54] FLUID FLOW DEVICE

[75] Inventor: Jack E. Lake, Racine, Wis.

[73] Assignee: Racine Federated, Inc., Racine, Wis.

[21] Appl. No.: 196,857

[22] Filed: Oct. 14, 1980

[51] Int. Cl.³ .............................................. G01F 1/00
[52] U.S. Cl. ......................... 200/153 LA; 200/153 T; 73/861.58
[58] Field of Search ...... 200/157 T, 153 LA, 81.9 M, 200/81.9 R, 82 C; 73/861.58, 861.51, 861.54

[56] References Cited

U.S. PATENT DOCUMENTS

| | | | |
|---|---|---|---|
| 2,325,884 | 8/1943 | Schorn | 73/861.58 |
| 3,218,853 | 11/1965 | Ongaro | 73/861.54 |
| 3,414,693 | 12/1968 | Watson et al. | 200/153 LA |
| 3,573,409 | 4/1971 | Jeffrey | 200/153 LA |
| 3,805,611 | 4/1974 | Hedland | 73/861.58 |
| 3,937,912 | 2/1976 | Martin | 200/153 LA |

OTHER PUBLICATIONS

Sheets 1 and 2 of Blueprint Drawing 780–000 of Hedland Products Division, 12/19/1979.
One Page Advertisement of Form #000/08 of Hedland Products.
One Sheet Entitled, "Standard Basic Switches", Types Z,M,A,E,PT,MT, 6AS and 3MN.

*Primary Examiner*—Willis Little
*Attorney, Agent, or Firm*—Arthur J. Hansmann

[57] ABSTRACT

A fluid flow device having a housing with a movable piston therein for indicating the rate of fluid flowing through the housing. A tapered member is on the outside of the housing and moves therealong through the provision of a magnet on the piston and a piece of magnetically responsive metal on the tapered member. Two electric switches are disposed adjacent the tapered member and have actuating arms in contact therewith for moving the electric points on the switches in accordance with the movement of the tapered member along the fluid housing. Electric signals and electric motors are connected with the switches for respectively indicating the condition of the switches and controlling the electric motors and thus controlling the flow of fluid in the system. A graduated scale is on the housing for indicating the rate of flow through the housing, by means of the tapered member moving along the scale in accordance with that rate of flow.

7 Claims, 4 Drawing Figures

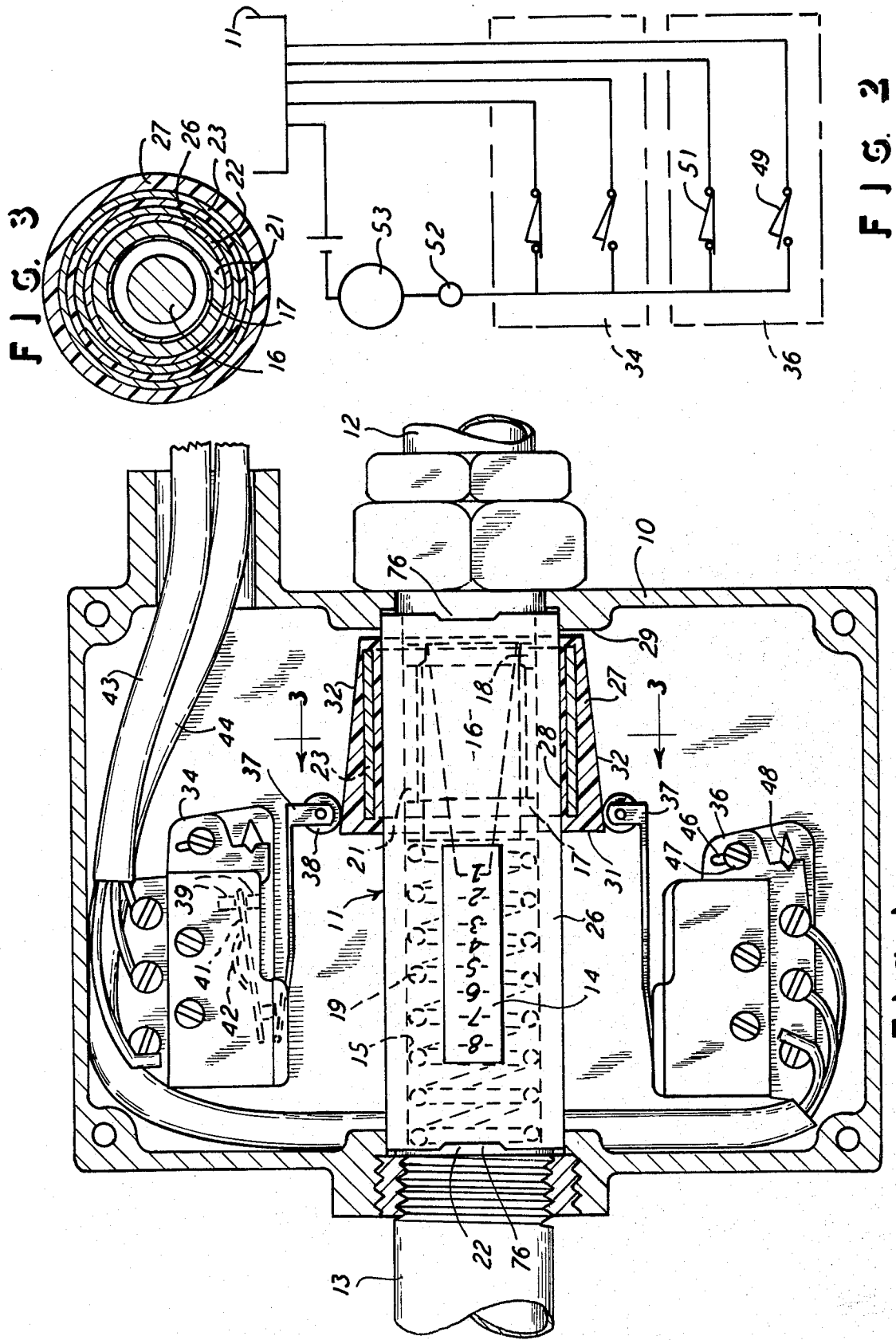

FLUID FLOW DEVICE

This invention relates to a fluid flow device, and, more particularly, it relates to an electric switch operated by means of a tapered member moving in accordance with the rate of flow through a fluid-tight housing.

BACKGROUND OF THE INVENTION

Fluid flow devices are already well known in the prior art and they exist in forms where an indicator will move in accordance with the rate of flow and will indicate that rate of flow on a scale adjacent the indicator. An example of that prior art device which also incorporates a magnet for moving the indicator is disclosed in U.S. Pat. No. 3,805,611. That prior art is simply a fluid flow meter which visually indicates the rate of flow of fluid through the meter and it does so by means of a movable piston within the meter and a magnet attached to the piston and thus effective for moving an indicator on the exterior of the meter housing.

Further aspects of the prior art include flow meters which have light rays and which have electric means for tracking the movement of a piston or the like and thus indicating the rate of flow. Such prior art is shown in U.S. Pat. Nos. 2,325,884 and 3,218,853. Still further, the prior art includes a flow meter with a movable piston having a magnet and having a follower indicator and also having an electric switch which is actuated by the movement of the indicator. In that instance, the indicator is simply a cylindrical piece which slides over the meter housing, in accordance with the rate of flow, and its movement contacts a switch arm for controlling the electric switch. That is, that prior art is like that shown in U.S. Pat. No. 3,805,611 where the cylindrical indicator would move into contact with a switch arm and the switch would thus be in one switch position when not contacted by the arm and in another switch position when contacted by the arm and thus there were only those two extremes for the switch in that the switch was immediately moved from one position to another by the leading edge of the cylindrical indicator as it moved toward or away from the switch arm. For the present record, that prior art is further disclosed by means of a blueprint drawing submitted herewith.

The prior art also had the further concern that the adjustment of the switches, that is the point at which the switch would actually move from say an "off" position to an "on" position, was difficult to make in any accurate manner, and it was also susceptible to tampering with adjustment since the adjustments for the switches extended to the exterior of a container surrounding the meter itself. Still further, the switches of the prior art were required to be physically displaced to a degree where the wires extending to the switches were a problem in that they needed to be sufficiently sturdy and long and disposed so that they could accommodate the required displacement of the switch in the adjustments mentioned. Still further, where the prior art has its switch arms clear of the indicator which in turn is moved by magnetic power, the switch arm could actually interfere with the true and accurate movement of the magnetic follower indicator when the switch arm and the indicator would come into initial contact. That is, the switch arm could retard the movement of the indicator in either of its moving directions and thus there would be an inaccurate position of the indicator and a consequent inaccurate indication of the rate of flow through the meter. The considerations of wear and reliability of that type of prior art indicator presented a problem compared to the arrangement in the present invention.

The present invention improves upon the prior art in that it provides a fluid flow device wherein an electric switch can be disposed adjacent a tapered member which moves in accordance with the rate of flow through the meter, and the switch arm is always in contact with the tapered surface and thus the problems of impeding the movement of the tapered surface or creating great stress and wear with respect to the switch arm are not present in this invention. Accordingly, the present invention provides for a more accurate control of the electric switch, or switches, which are operated by means of the tapered member.

Other objects and advantages will become apparent upon reading the following description.

BRIEF DESCRIPTION OF THE DRAWINGS

FIG. 1 is a sectional view through a box containing an embodiment of this invention.

FIG. 2 is an electric schematic showing parts incorporated in FIG. 1.

FIG. 3 is a sectional view taken along the line 3—3 of FIG. 1.

DETAILED DESCRIPTION OF THE PREFERRED EMBODIMENT

Figure 4:
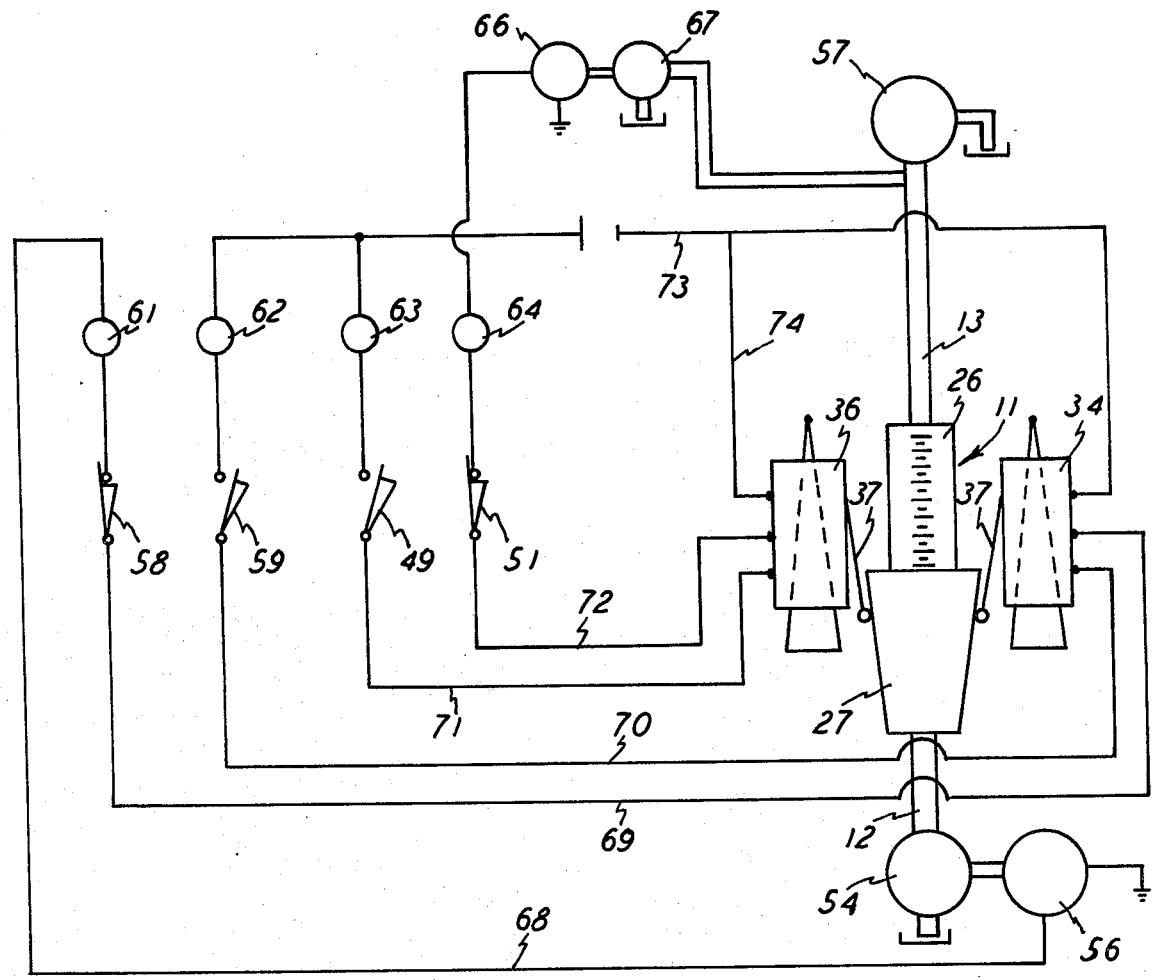
FIG. 4 is an electric schematic and a diagramatic view of the device of this invention and showing parts thereof shown in FIG. 1.

For background, and also for further disclosure by reference and incorporation herein, reference is made to U.S. Pat. No. 3,805,611 which shows a fluid flow meter having a piston movable within the meter in accordance with the rate of flow, and a magnet moves an indicator along with the piston and thus the indicator will show the rate of flow on a visual scale. The same is true of the present disclosure which reveals a container or box 10 incorporating the flow meter 11 which in turn has an inlet fluid pipe 12 and an outlet fluid pipe 13 connected thereto. Thus fluid can flow from the right and to the left, as viewed in FIG. 1, and a numerical scale 14 affixed to the meter 11 will give a visual indication of the rate of flow in gallons per minute, for instance. It will be understood that a fluid pump is directing the fluid into the pipe 12, and the connection or pipe 13 is directing the fluid to a fluid motor, for instance, and this will be further explained in connection with FIG. 4.

The meter 11 has a hollow interior 15 through which the fluid will flow, and there is a fixed tapered member 16 disposed within the interior of the meter 11 and fluid can flow past the tapered member 16. A cylindrically-shaped piston 17 surrounds the pin 16 and presents a piston head 18 to the incoming fluid. Thus, upon adequate flow of fluid, the piston 17 will move to the left, as viewed in FIG. 1, and a compression spring 19 yieldingly urges the piston 17 to the right. By virtue of the conventional parts described, the piston 17 will be displaced to the left in accordance with the rate of flow of fluid through the meter 11.

A magnet 21, of a cylindrical shape, is affixed to the piston 17 and thus moves therewith, and the meter housing 22 is also cylindrical and is of a material which permits the magnet to be effective through the housing 22 and thus attract a magnetic follower 23 on the exterior of the meter housing 22. Of course the follower 23 is of a magnetically attractive material of iron and thus will move in accordance with the left and right movement of the piston 17.

The foregoing describes the basic and conventional structure of a flow meter utilizing a magnet in a piston which moves over a tapered center pin, all as shown and described. Further, the foregoing, and even more detailed thereof, is shown and described in U.S. Pat. No. 3,805,611 which disclosure is incorporated herein by reference to that patent.

A frusto-conical member 27 is slidably disposed on a tube 26 which surrounds the meter cylindrical housing 22 and which carries the scale 14. Member 27 has a cylindrical interior wall 28 which is in snug sliding contact with the exterior of the cylindrical sleeve 26, and thus the member 27 moves to the left and right, as viewed in FIG. 1 and it can move from a stop position against the housing wall 29 to a leftward position at the end of the scale 14 where the edge 31 of the member 27 aligns with the high number on the scale 14, for instance. It is that edge 31 which permits the operator to view the number on the scale 14 and to visually determine the rate of flow of say gallons per minute through the meter 11.

The exterior surface 32 of the member 27 is the conical surface shown and described, and it of course extends endlessly around the member 27. The member 27 is preferably made of a plastic material which can be molded to encase and incorporate the cylindrical magnetic follower 23, as shown. With that arrangement, the member 27 will move in precise unison with the movement of the piston 17 which is carrying the magnet 21.

In addition to the function of the visual read-out, the present invention provides for electric signal and electric controls of elements which are related to the meter 11. For that purpose, two electric micro-switches 34 and 36 are mounted in the box 10 adjacent the meter 11. Each switch has a pivot arm 37 which is the actuating arm for the switch, and a roller 38 is supported on the arm 37 and extends into rolling contact with the tapered or inclined surface 32 of the member 27. The switches 34 and 36 are of a conventional nature and therefore are of the standard micro-switch arrangement with each switch having two switch positions, and with the switch being spring urged toward one position thus, the arms 37 are always urged toward the inclined surface 32, but of course since the inclined surface 32 causes the arms 37 to pivot toward and away from their respective switch bodies, the switches will be actuated in accordance with the longitudinal or axially displacement of the member 27 in accordance with fluid flow through the meter 11. For instance, the switch 34 is shown to have contact points 39 engagable by a movable arm 41 under the control of the pivot arm 37, and a spring piece 42 further controls the arm 41, all in the conventional manner of that type of micro-switch. FIG. 1 further shows electric cables 43 and 44 extending into the housing 10 and being connected to the respective switches 34 and 36. Further, the switches 34 and 36 are adjustable toward and away from the control member 27, and that adjustment can be made by the adjustment slot 46 and retaining screw 47 which will permit the basic portion of the switch to be moved toward or away from the meter 11 and thus alter the point at which the particular switch will make or break its particular electric contact relative to the movement of the pivot arm 37. Further, an adjustment slot 48 is included in each switch, and that type of adjustment is the same as that found in present-day automobiles for adjusting the engine ignition points.

In this invention, there could be only one switch 34 or 36, and the use of two switches can be considered as a "high" switch and a "low" switch, relative to the rate of flow through the meter 11. FIG. 2 generally shows the "low" range switch 34 and the "high" range switch 36, and these two switches have normally open contacts 49 and normally closed contacts 51. Further, an electric signal, in the form of a light 52, and an electric motor 53 is shown in the circuit in FIG. 2, and more detail of this circuit is explained in connection with FIG. 3. Thus, when the member 27 moves far enough under the rates of flow required according to the setting of the respective switches, the switches 34 and 36 will switch or open in response to that position and the pivotable movement of their respective arms 37, in a conventional manner.

While various types of electric switches, or, as mentioned above, only one switch, could be used in connection with the movable conical member 27 which actuates the switches, the drawings show the two microswitches 34 and 36. In that system, FIG. 3 shows a main fluid pump 54 driven by an electric motor 56, and the pump 54 supplies the meter 11 and thhe flow goes to a fluid motor 57, as indicated. The motor 57 can be driving a conveyor or any other piece of equipment in any conventional arrangement. The drawing further shows the switch contacts 49 and 51 and it shows switch contacts 58 and 59 which are in the switch 34, as shown. Signals, in the form of electric lights 61, 62, 63, and 64 are also shown in the electric circuitry shown in FIG. 3. Thus, upon start-up, a by-pass switch which is not shown can be used to electrically energize the motor 56 to pass the fluid to the fluid motor 57. One example of use is such that when the fluid flow is over two gallons per minute, the contacts 58 are closed and the light 61 is on and of course the motor 56 is in the closed circuit and is operating. If the flow dropped below two gallons per minute, then the movement of the member 27 would cause the switches 58 and 59 to reverse in their respective closed and open positions shown and then the switch 58 would open and the motor 56 would stop. At that time the signal 62 would be on when the contacts 59 are closed. In that instance, that would signal that the conveyor which could be driven by the motor 57 is moving too slow.

Next, the contacts 49 and 51 would be set such that, for instance, they would switch when the flow reaches six gallons per minute. As shown, there is an electric motor 66 driving a fluid pump 67 which feeds the fluid motor 57. Thus, the switch per position 51 is closed until the flow reaches six gallons per minute, for instance, and thus the pump 67 is operating.

When the flow gets beyond six gallons per minute, the switch 36 operates to open at contacts 51 and thus stop the motor 66. Therefore, the arrangement is such that the switches control the flow between the two and six gallons per minute limits, and that could be a desired flow for operative a conveyor or the like. Of course the diagrammatic showing in FIG. 4 includes the showing of the electric lines 68 through 74, for instance. With this arrangement, there is the conical member 27 which presents the incline or tapered surface 32 to the actuating arms 37 of the electric switches. The arms 37 are of course spring-urged into contact with the surface 32, and the arms 37 are always in contact with the surface 32 so that there is an accurate positioning of the arm 37 and the member 27 is not retarded in its movement by the arms 37, such as it would be if the arms 37 were off the member 27 at some times and then were abutted by the moving member 27. The inclined ramp surface 32 always contacts the switch arms 37 and therefore moves the arms in proportion to the movement of the member 27 axially in the meter and thus in accordance with the rate of flow through the meter. Only when the member 27 reaches a selected location, will the switch 34 or 36 be actuated with respect to its switch points mentioned, and they are of course set for different points of actuation, as described in connection with FIG. 3. Thus the member 27 serves as a cam to the follower rollers 38 associated with the switches. The switch arms 37 are always disposed radially outwardly of the inclined surface 32, and the adjustment means, such as the set screw 36, for the switches and that arrangement for adjustment permits the switches to more radially relative to the member 27, and thus accurate setting can be achieved and only minimal movement of the electric wires within the cables 43 and 44 is involved.

Further, the cylindrical member 26 has room at the ends thereof to slide back and forth relative to the box 10 and the remainder of the meter 11, and that carries the scale 14 into adjustable positions. To do this, a screwdriver blade can be placed into the slot 76 in each end of the member 26 to slide the member 26 axially of the meter 11, and the member 26 will remain in frictionally held position on the portion 22 of the meter 11. Thus there is a combined visual indication of the rate of flow, as well as the indication of the rate of flow between a lower and upper limit, as described above, and the four light signals will indicate that flow, and in fact the switches will control the off and on of the electric motors 56 and 66. In that circuitry, the wires 73 and 74 can be considered to be a common connection while the wires 69 and 72 can be considered the normally closed connections of the two switches and thus the wires 70 and 71 can be considered the normally open switch wires for those switch positions shown.

The micro-switches 34 and 36 are of a construction of the type manufactured by Microswitch, Division of Honeywell, Inc., of Freeport, Illinois, and the model number is X71581-BM.

What is claimed is:

1. In a fluid flow device, a housing having a fluid inlet and a fluid outlet and a fluid chamber intermediate said inlet and said outlet, a piston movably disposed in said chamber in accordance with fluid flow in said chamber, a spring in said chamber and in abutment with said piston for urging said piston in one direction, a magnet attached to said piston for movement with said piston, a magnetic follower piloted on the exterior of said housing for movement with the movement of said magnet, an electric switch mounted on said housing and including an actuating arm and a spring urging upon said arm and with the extending end of said arm being in the path of movement of said follower and spring-urged into the path of movement of said follower for actuation of said switch in response to movement of said follower, an electric element electrically connected with said switch for actuation by said switch, the improvement comprising said switch arm extending end being in contact with said magentic follower when said piston is in said one direction, said magnetic follower having a uniformily inclined ramp surface aligned with said switch arm and in constant contact with said switch arm extending end for movement of said switch arm upon movement of said magnetic follower and swinging said switch arm in proportion to the movement of said magnetic follower to to thereby actuate said switch only when said magnetic follower moves to a selected location relative to said housing.

2. The fluid flow device as claimed in claim 1, wherein said housing is cylindrical on its exterior, and said follower is a conically shaped cam on its exterior to present said inclined ramp surface, and said follower has a cylindrical interior supply slidably mounted on said cylindrical housing.

3. The fluid flow device as claimed in claim 1 or 2, wherein said switch is a two-way micro-switch and said switch arm is disposed radially outwardly relative to said inclined surface, and adjustment means connected with said switch for adjusting said switch toward and away from said housing.

4. The fluid flow device as claimed in claim 3, including two of said switches each with a said arm in constant contact with said inclined surface, said switches having electric contacts and being set in different settings for said contacts to respectively respond to two different rates of flow through said housing.

5. The fluid flow device as claimed in claim 1 or 2, including a numerical scale attached to said housing and disposed adjacent said follower for indicating the rate of flow of fluid through said housing.

6. The fluid flow device as claimed in claim 5, including said scale being selectively adjustably mounted on said housing by being slidably thereon for adjustably positioning said scale along said housing.

7. The fluid flow device as claimed in claim 1 or 2, including a roller attached to said extending end of said switch arm and in constant rolling contact with said inclined surface.

* * * * *